July 1, 1958

E. R. JAHNS 2,841,110

MECHANICAL APPARATUS FOR DISPLAYING
ELECTRICAL PHENOMENA OR THE LIKE

Filed Dec. 10, 1956

EDWARD R. JAHNS
*INVENTOR.*

BY

HIS ATTORNEY

July 1, 1958  
E. R. JAHNS  
2,841,110  
MECHANICAL APPARATUS FOR DISPLAYING  
ELECTRICAL PHENOMENA OR THE LIKE  
Filed Dec. 10, 1956  
4 Sheets-Sheet 3

EDWARD R. JAHNS  
*INVENTOR.*

BY  
HIS ATTORNEY

July 1, 1958

E. R. JAHNS 2,841,110

MECHANICAL APPARATUS FOR DISPLAYING
ELECTRICAL PHENOMENA OR THE LIKE

Filed Dec. 10, 1956

EDWARD R. JAHNS
*INVENTOR.*

BY

HIS ATTORNEY

United States Patent Office 2,841,110
Patented July 1, 1958

2,841,110

MECHANICAL APPARATUS FOR DISPLAYING ELECTRICAL PHENOMENA OR THE LIKE

Edward R. Jahns, Los Angeles, Calif., assignor to Hoffman Electronics Corporation, a corporation of California Application December 10, 1956, Serial No. 627,495

2 Claims. (Cl. 116—124.1)

This invention is related to means for displaying electrical phenomena and, more particularly, to new and useful mechanical apparatus for displaying electrical phenomena, which apparatus will be of simple and inexpensive construction.

It is an object of the present invention to provide simple and inexpensive mechanical means, mechanically actuatable, for simulating visually selected electrical phenomena.

It is a further object of the present invention to provide mechanical apparatus for high-fidelity receiving equipment, for example, which will indicate visually to the operator the simulated performance of the high-fidelity equipment in terms of a graph having rectangular coordinate axes of frequency and gain, respectively.

According to the present invention, there is associated with high-fidelity receiving equipment, for example, a graph which exhibits rectangular coordinate axes of first and second electrical conditions. Associated with the aforementioned graph is a flexible indicating rod having a minor portion thereof fixedly disposed with respect to a point or area on said graph and a major portion thereof adapted for selective displacement along an imagined surface which is equidistant from the aforementioned graph. Means are provided for accomplishing the aforementioned selective displacement of the major portion of said indicating rod, this means being mechanically coupled to an electrical control, actuation of which control results in electrical phenomena as shall be physically indicated by the aforementioned indicating rod and graph.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 5 is a rear view of the apparatus shown in Figure 4.

Figure 1:
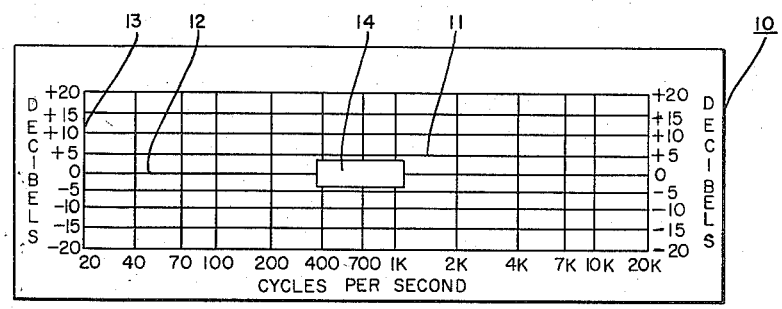
Figure 1 is a frontal view of a transparent member employed in one embodiment of the present invention, which transparent member has disposed upon a surface thereon a graph exhibiting first and second rectangular coordinate axes each representing a given electrical condition.

In Figure 1, transparent member 10 is provided with a graph 11 having rectangular coordinate axes 12 and 13 representing frequency (in cycles per second) and gain (represented in decibels), respectively. Frequency and gain increments are identified by appropriate numerals, as are shown on the graph. In the center of the graph there may be disposed an opaque portion (or manufacturer's nameplate, for example) so as to preclude the viewing of necessary, through unaesthetic, mechanical elements disposed to the rear of the central opaque portion. This opaqe portion (or manufacturer's nameplate) may be designated portion 14.

Figure 2:
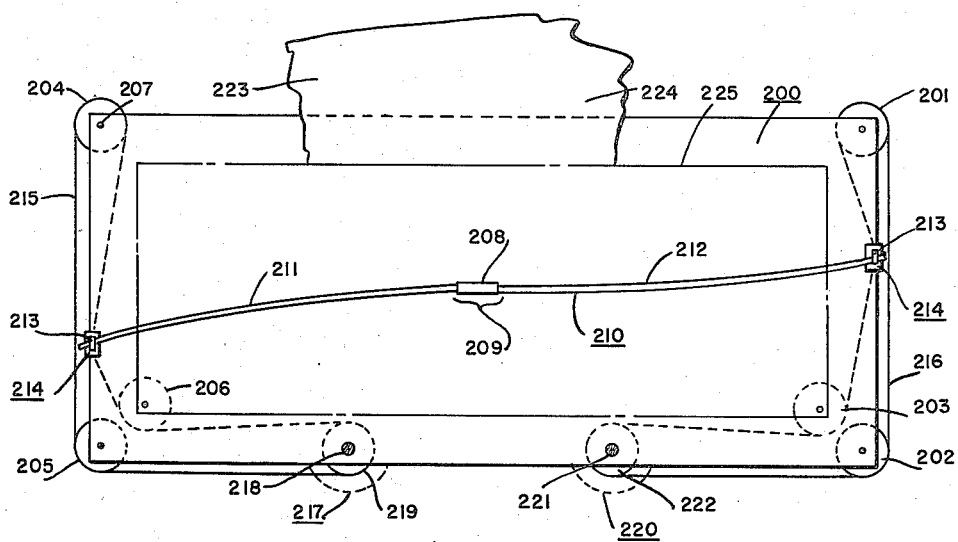
Figure 2 is a frontal view of a mounting plate together with the apparatus associated therewith which may be utilized in conjunction with the employment of the transparent member of Figure 1.

In Figure 2 is shown mounting plate 200 upon which are mounted idler wheels 201, 202, 203, 204, 205, and 206. The idler wheels 201 through 206 are rotatably affixed to mounting plate 200 by means of axis pins 207. Also mounted upon mounting plate 200 is mounting element 208, which securely affixes central minor portion 209 of flexible indicating rod 210 to mounting plate 200. Flexible indicating rod 210, in addition to having central minor portion 209, also is provided with first major portion 211 (shown on the left of the viewer) and second major portion 212 (shown on the right of the viewer). The end regions of first and second major portions 211 and 212 of flexible indicating rod 210 cooperate with C-shaped finger portion 213 of each of the two slider elements 214, which slider elements are mounted upon a respective side edge of mounting plate 200. Each of the slider elements is securely affixed to guide wires 215 and 216. It will be realized that guide wires 215 and 216 may be constituted by either wire, string, thread, or other suitable material. Bass boost control 217 is provided with a control shaft 218 having mounted thereon drive wheel 219. Guide wire 215 is a closed loop and intercouples idler wheels 204, 205, and 206 with drive wheel 219. Treble boost control 220 is provided with control shaft 221 upon which drive wheel 222 is mounted. Guide wire 216 is a closed loop, similar to guide wire 215, and intercouples idler wheels 201, 202, and 203 with drive wheel 222. Thus, it is clearly seen that the manual rotation of shaft 218, of bass boost control 217, will translate vertically slider element 214 (on the left) so as to change the disposition and curvature of first major portion 211 of flexible indicating rod 210; correspondingly, the rotation of shaft 221 associated with treble boost control 220 will cause the vertical translation of slider element 214 (on the right) so that the disposition and curvature of second major portion 212, of flexible indicating rod 210, will be changed. Suppose now that fragmentary portion 223 of electronic equipment-containing cabinet 224 is provided with a rectangular aperture 225 (shown in phantom line), which is disposed immediately in front of mounting member 200. Suppose further that transparent member 10 in Figure 1 is disposed within or over aperture 225 of cabinet 224. It will be seen that central portion 14 of transparent member 10 will cover the mounting element 208 in Figure 2. Thus, by rotating shaft 218 of bass boost control 217, the operator will alter, simultaneously, the disposition of first major portion 211 of the indicating rod 210, and the graph shown in Figure 1 may be drawn so that the configuration of first major portion 211 will substantially indicate the frequency versus gain response of the associated electronic equipment. Similarly, the rotational displacement of shaft 221 associated with treble boost control 220 will produce the translational displacement of slider element 214. The movement of slider element 214 will in turn produce a re-orientation of the second major portion 212, of flexible indicator rod 210 so that, provided the graph associated with transparent member 210 is calibrated properly, the second major portion of the flexible rod in conjunction with the graph will indicate the frequency versus gain response of the electronic equipment with which treble boost control 220 is associated.

Figure 3:
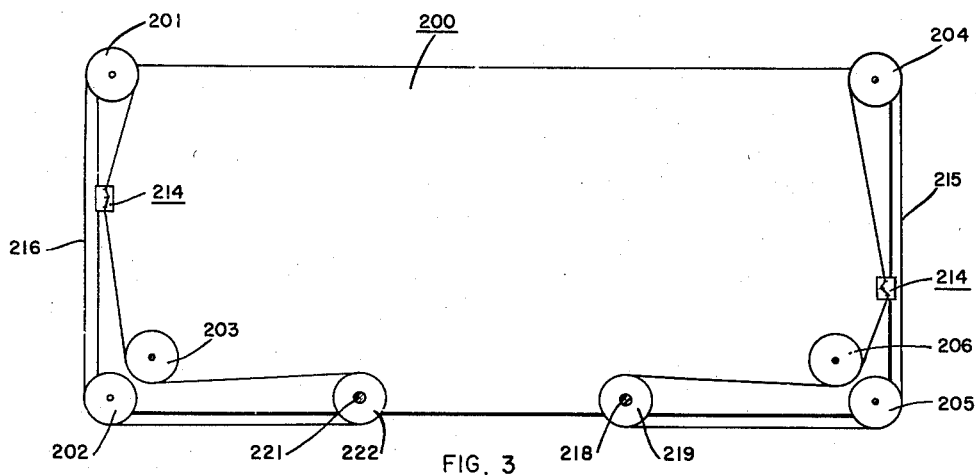
Figure 3 is a rear view of the apparatus of Figure 2.

Figure 3 is a rear view of the apparatus of Figure 2. It should be mentioned again that vertically translatable slider element 214 has in practice a substantially C-shaped cross-section and is provided with a stamped out C-shaped finger adapted to slidably retain the respective major portion of the flexible indicating rod. Preferably the indicating rod should be fabricated from colored material such as material having the trade name "Lucite."

Figure 4:
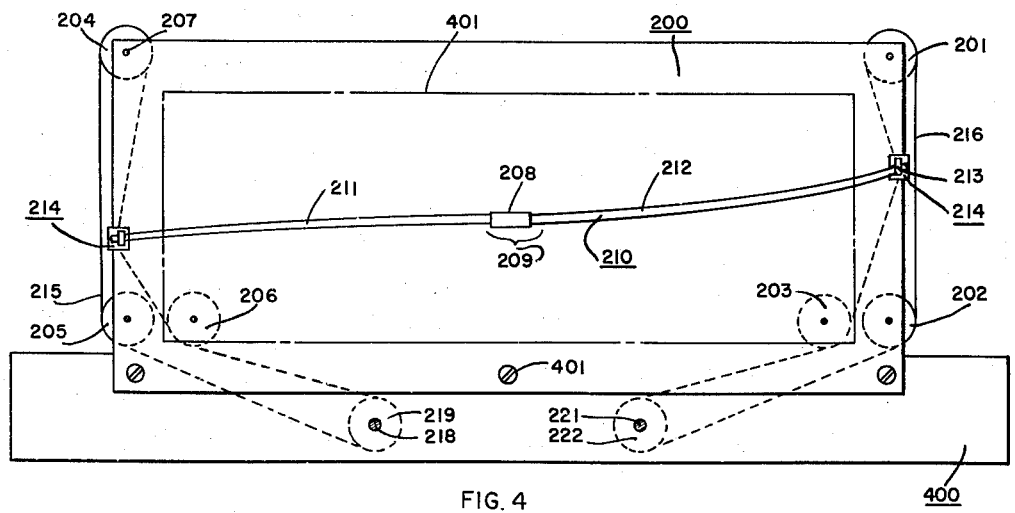

In Figure 4 mounting plate 200 together with its associated equipment is mounted upon electrical chassis 400 by three screws 401 and cooperating nuts or other suitable attachments. Electrical chassis 400 provides bass and treble control shafts 218 and 221 upon which are mounted drive wheels 219 and 222. Thus, in the configuration shown in Figure 4, the mounting plate itself need not supply access holes for the bass and treble boost control shafts since these will be provided in the electrical chassis proper. Phantom line 401 indicates the outline of the rectangular aperture of the cabinet with which transparent member 10 in Figure 1 cooperates.

Figure 5:
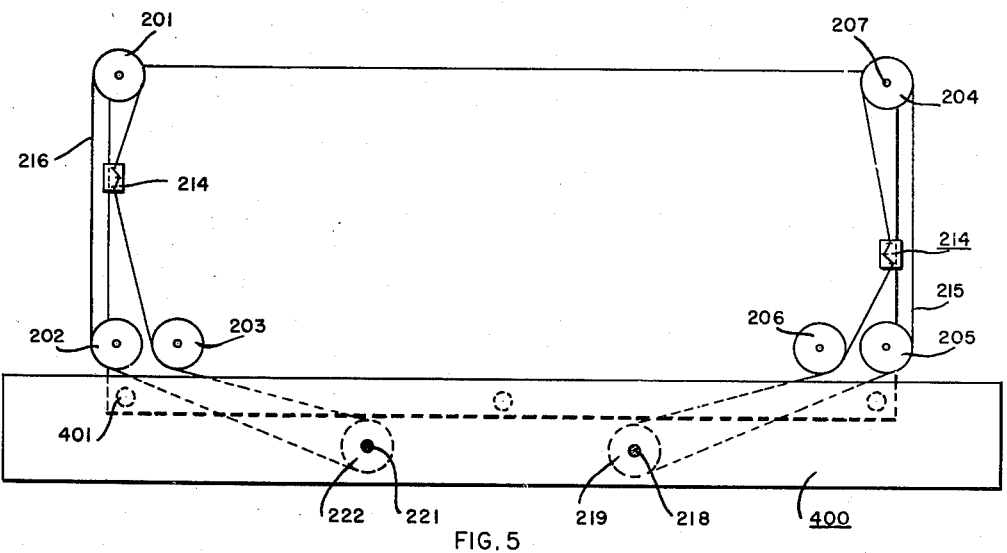
Figure 5 illustrates a type of mounting plate, together with its associated equipment, upon the electrical chassis involved.

Figure 5 is a rear view of the apparatus shown in Figure 4 and requires no explanation other than that given for the above figures.

Figure 6:
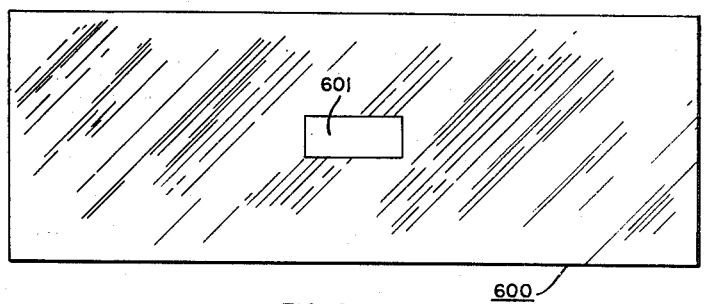
Figure 6 is a frontal view of a transparent member similar to the transparent member of Figure 1, but not including on the surface thereof the graph indicated in Figure 1.

Transparent member 600 in Figure 6 is, for a second embodiment of the present invention, not provided at a surface thereof with the aforementioned graph. However, there may be provided an opaque portion, perhaps including a manufacturer's plate, such as portion 601 at approximately the center of transparent member 600.

Figure 7:
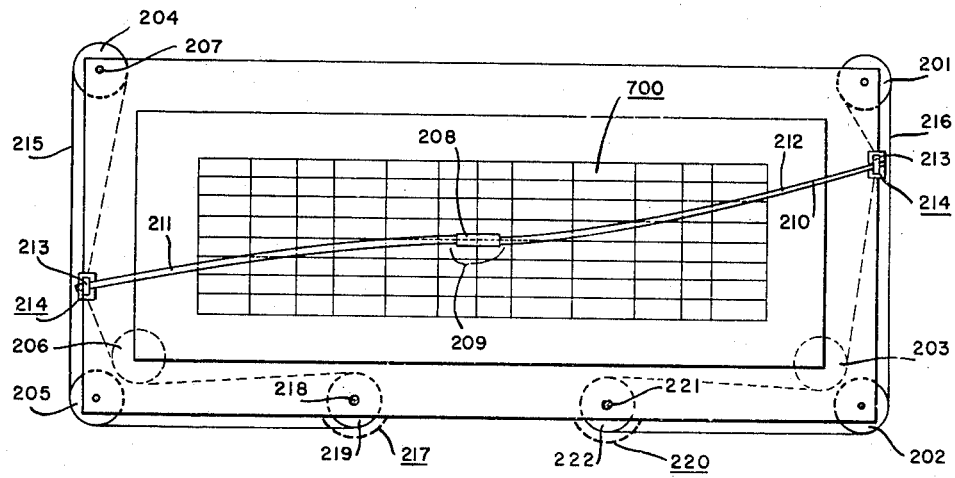
Figure 7 illustrates by front view apparatus similar to the apparatus shown in Figure 2, but with a graph having two coordinate axes representing electrical conditions disposed upon the front surface of the apparatus.

Instead of the frequency versus gain graph being disposed upon a surface of transparent member 600, the graph may be disposed on the outer surface of mounting plate 700, shown in Figure 7. With this limited exception, mounting plate 700, together with its associated equipment, operates substantially the same as the apparatus shown in Figures 2 and 3.

Figure 8:
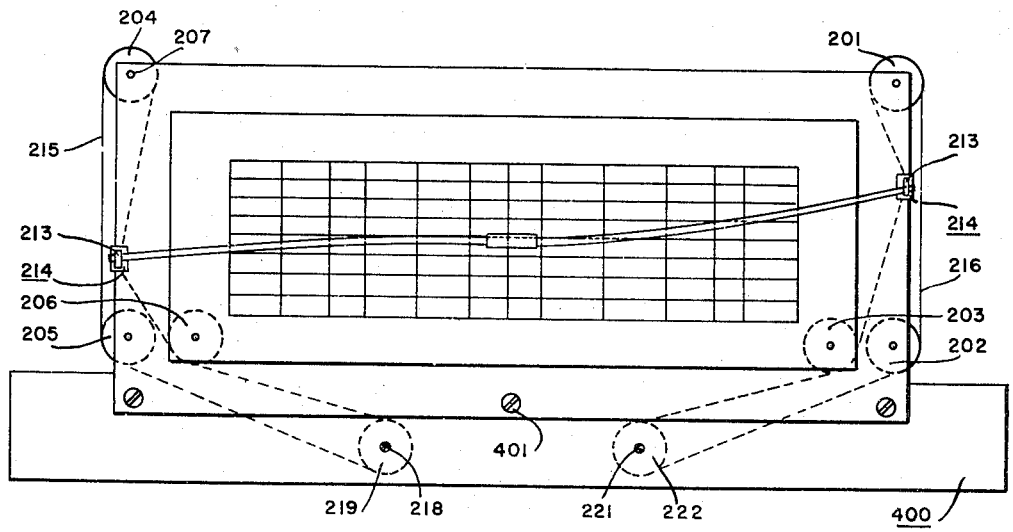
Figure 8 illustrates in front view apparatus similar to the apparatus shown in Figure 4, but with a graph having two coordinate axes representing respective electrical conditions deposited upon a front surface thereof.

Figure 8 is a substantially identical to Figure 4, with the exception that the mounting plate is provided with the frequency versus gain graph, instead of the transparent member which is normally disposed in front of the mounting plate.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a graph disposed upon a first surface and having first and second rectangular coordinate axes each representing a respective electrical condition, a flexible indicating rod disposed in proximity with said graph, said flexible rod having a minor portion fixedly disposed with respect to said graph and a major portion adapted for selective displacement along a second and imaginary surface which is equidistant from said first surface, a stationary mounting plate fixedly disposed with respect to said minor portion of said flexible rod and equidistant from said first surface, a rotationally adjustable electrical control, and means intercoupling said electrical control with said flexible rod for varying the disposition of said major portion of said rod in response to the rotational displacement of said control to indicate visually the electrical phenomena resulting from the adjustment of said control, said intercoupling means consisting of a slider element disposed upon a side edge of said stationary mounting plate and having means for slidably retaining said major portion of said flexible rod, said slider element being adapted for translational displacement along said side edge of said stationary mounting plate, a plurality of idler wheels mounted upon a surface of said stationary mounting plate, a concentric drive wheel mounted upon said electrical control, and a guide wire fixedly attached solely to said slider element and disposed about said idler wheels and concentric drive wheel in frictional relationship.

2. In combination, a cabinet provided with at least one aperture, an electrical chassis enclosed within said cabinet and having rotationally adjustable bass and treble boost controls which are actuable exteriorly from said cabinet, a transparent member disposed over said aperture, a planar graph of frequency versus decibels disposed in visual alignment with said aperture, a stationary mounting plate affixed to said chassis in the region of said cabinet aperture, said stationary mounting plate having first and second side edges, a flexible indicating rod having a minor central portion affixed to said mounting plate at a central region thereof in line with the center of said graph, said flexible rod also having first and second major portions movable within a plane parallel to said graph, first means intercoupling said bass boost control with said first major portion of said rod for varying the disposition of said first major portion of said rod in response to the rotational displacement of said bass boost control to indicate visually the electrical phenomena resulting from the adjustment of said control, and second means intercoupling said treble boost control with said second major portion of said rod for varying the disposition of said second major portion of said rod in response to the rotational displacement of said treble boost control to indicate visually the electrical phenomena resulting from the adjustment of said control, said first and second intercoupling means each being comprised of a slider element disposed upon a respective one of said side edges of said stationary mounting plate and having means for slidably retaining a respective major portion of said flexible rod, said slider element being adapted for translational displacement along said respective side edge of said stationary mounting plate, a plurality of idler wheels mounted upon a surface of said stationary mounting plate, a concentric drive wheel mounted upon said control, and a guide wire fixedly attached solely to said slider element and disposed about said idler wheels and concentric drive wheel in frictional relationship.

References Cited in the file of this patent
UNITED STATES PATENTS

| 2,298,987 | Thomsen | Oct. 13, 1942 |
| 2,781,736 | Bennett | Feb. 19, 1957 |